(12) United States Patent
Song et al.

(10) Patent No.: US 10,081,546 B2
(45) Date of Patent: Sep. 25, 2018

(54) NANO-DIAMOND, METHOD OF MANUFACTURING THE SAME, AND NANO-FLUID USING THE SAME

(71) Applicant: Hyundai Motor Company, Seoul (KR)

(72) Inventors: Kyong Hwa Song, Seoul (KR); Sung Wook Na, Gyeonggi-do (KR); Jinhyeok Cha, Gyeonggi-do (KR); Hunwoo Park, Gyeonggi-do (KR); In Woong Lyo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 181 days.

(21) Appl. No.: 14/935,870

(22) Filed: Nov. 9, 2015

(65) Prior Publication Data

US 2017/0057828 A1  Mar. 2, 2017

(30) Foreign Application Priority Data

Sep. 1, 2015 (KR) .................... 10-2015-0123854

(51) Int. Cl.
*C09K 5/00* (2006.01)
*C01B 31/06* (2006.01)
(Continued)

(52) U.S. Cl.
CPC ............ *C01B 31/065* (2013.01); *C01B 32/28* (2017.08); *C09K 5/10* (2013.01)

(58) Field of Classification Search
CPC ........... C09K 5/08; C07C 45/00; C07C 51/16; C01B 31/065
(Continued)

(56) References Cited

U.S. PATENT DOCUMENTS

2005/0158549 A1* 7/2005 Khabashesku .......... C01B 32/28
                                                     428/403
2010/0298600 A1* 11/2010 Lee .................. C01B 33/10778
                                                     562/523
(Continued)

FOREIGN PATENT DOCUMENTS

JP           5346427 B2    11/2013
KR       2011-0093700 A     8/2011
(Continued)

OTHER PUBLICATIONS

Krueger et al., "Functionality is Key: Recent Progress in the Surface Modification of Nanodiamond", Adv. Funct. Mater. 2012, 22, 890-906; published online Mar. 7, 2012 (Year: 2012).*

(Continued)

*Primary Examiner* — Jane L Stanley
(74) *Attorney, Agent, or Firm* — Mintz Levin Cohn Ferris Glovsky and Popeo, P.C.; Peter F. Corless

(57) ABSTRACT

The present invention relates to a nano-diamond, a method of manufacturing the same, and a nano-fluid using the same. The nano-diamond is prepared to comprise functional group represented by the following Chemical Formula 1 that is introduced onto a surface thereof.

[Chemical Formula 1]

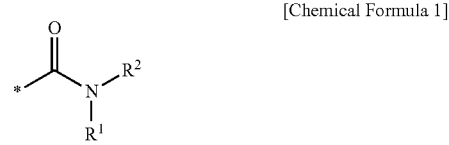

14 Claims, 5 Drawing Sheets

(51) Int. Cl.
*C09K 5/10* (2006.01)
*C01B 32/28* (2017.01)

(58) Field of Classification Search
USPC .................................................. 252/74, 77
See application file for complete search history.

(56) References Cited

U.S. PATENT DOCUMENTS

| | | | | |
|---|---|---|---|---|
| 2011/0006218 | A1* | 1/2011 | Mochalin | B82Y 30/00 250/459.1 |
| 2011/0172132 | A1* | 7/2011 | Branson | B82Y 30/00 508/126 |
| 2011/0252711 | A1* | 10/2011 | Chakraborty | B01J 3/062 51/298 |
| 2011/0252713 | A1* | 10/2011 | Chakraborty | B01J 3/062 51/298 |
| 2012/0034464 | A1* | 2/2012 | Chakraborty | B82Y 30/00 428/402 |
| 2012/0271361 | A1* | 10/2012 | Zhou | A61B 17/866 606/304 |
| 2014/0314850 | A1* | 10/2014 | Badea | C07C 59/68 424/489 |

FOREIGN PATENT DOCUMENTS

| | | |
|---|---|---|
| KR | 2015-0015245 A | 2/2015 |
| WO | 01/68521 A2 | 9/2001 |

OTHER PUBLICATIONS

Mochalin et al. "The properties and applications of nanodiamonds", Nature Nanotechnology, vol. 7, Jan. 2012, 11-23. published online Dec. 18, 2011 (Year: 2011).*

Shenerova et al. "Modification of detonation diamonds by heat treatment in air", Diamond & Related Materials, 15, 2006, 1799-1803 ; published online Oct. 13, 2006 (Year: 2006).*

Barras et al. "Functionlization of diamond nanoparticles using "click" chemistry", Langmuire, 2010, 26(16), 13168-13172; published online Jul. 26, 2010 (Year: 2010).*

Zheng et al. "Organic functionlization of ultradispersed nanodiamond: synthesis and applications", J. Mater. Chem., 2009, 19, 8432-8441; published online Oct. 2, 2009 (Year: 2009).*

I. Tabujew et al., "Functionalization of Cationic Polymers for Drug Delivery Applications", RSC Polymer Chemistry Series No. 13, pp. 1-29, 2015 (Published Nov. 14, 2014).

* cited by examiner

NANO-DIAMOND, METHOD OF MANUFACTURING THE SAME, AND NANO-FLUID USING THE SAME

CROSS-REFERENCE TO RELATED APPLICATION

This application claims priority to and the benefit of Korean Patent Application No. 10-2015-0123854 filed in the Korean Intellectual Property Office on Sep. 1, 2015, the entire contents of which are incorporated herein by reference.

TECHNICAL FIELD

The present invention relates to a nano-diamond, a method of manufacturing the same, and a nano-fluid comprising the same.

BACKGROUND

A nano-diamond can exist in a powder form, and be manufactured by a high temperature and high pressure reaction and has high hardness. Generally, the nano-diamond has excellent wear resistance, scratch resistance, and the like, and a low frictional coefficient. Further, since the nano-diamond is chemically stable, corrosion resistance, acid resistance, and alkali resistance are excellent. In addition, due to a diamond structure, thermal conductivity is high and a thermal expansion coefficient is small. Therefore, the nano-diamond is a material which is suitable to be industrially applied.

Further, unlike other carbon materials, the nano-diamond has a high electrical resistance value, and thus may also be applied to a field requiring an insulating characteristic. Due to these characteristics, the nano-diamond has been continuously researched as a material for high efficiency of a heat exchanging medium.

A nano-diamond manufactured by a high temperature and high pressure explosion reaction has been manufactured in fine nano-particles having an average particle diameter of several tens of nanometers or less. As such, the nano-diamond has a wide specific surface area.

However, since the nano-diamond has the wide specific surface area, attractive force between particles may be strong. Therefore, the nano-diamond particles may form aggregates. The aggregates may cause some problems when the nano-diamond is used. For example, dispersion of the nano-diamond particles may be inferior without any treatment. Indeed, since the size of the nano-diamond particle required in the industry has gradually decreased, a demand for developing a dispersion stabilization technology for the nano-diamond has been grown.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a nano-diamond where dispersibility in a polar fluid is improved.

In preferred aspects, the present invention provides a nano-fluid using a nano-diamond such that dispersibility of the nano-diamond in a polar fluid may be substantially improved.

The term "nano-diamond" as used herein, refers to a particle that comprises or is composed of diamond or substantially homogenous diamond and preferably has an average particle diameter ranging from about 1 nm to about 990 nm, from about 1 nm to 500 nm, or particularly from about 1 nm to about 100 nm.

In one aspect of the present invention, provided is a nano-diamond that may comprise a functional group represented by the following Chemical Formula 1, and the functional group may be introduced onto a surface of the nano-diamond.

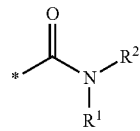

[Chemical Formula 1]

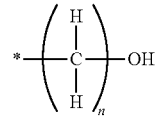

[Chemical Formula 2]

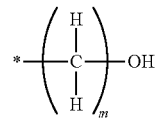

[Chemical Formula 3]

In Chemical Formula 1, $R^1$ and $R^2$ are each independently hydrogen, deuterium, a substituent group represented by Chemical Formula 2, or a substituent group represented by Chemical Formula 3; at least one of $R^1$ and the $R^2$ is independently the substituent group represented by the Chemical Formula 2, or the substituent group represented by the Chemical Formula 3; and in the Chemical Formula 2 and the Chemical Formula 3, n and m are each independently any one integer of 1 to 5.

Preferably, $R^1$ may be hydrogen, and $R^2$ may be the substituent group represented by Chemical Formula 2.

Preferably, in Chemical Formula 2, n may be 2.

An average particle diameter of the nano-diamond may range from about 1 to about 100 nm.

In another aspect, the present invention provides a method of manufacturing a nano-diamond. The method may comprise: preparing the nano-diamond; heat-treating the nano-diamond, for example, to oxidize a surface thereof; and introducing a substituent group represented by the following Chemical Formula 1 onto the surface of the nano-diamond having the oxidized surface. As consequence, the nano-diamond may comprise the substituent (functional) group on the surface thereof.

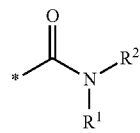

[Chemical Formula 1]

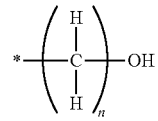

[Chemical Formula 2]

-continued

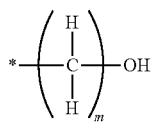
[Chemical Formula 3]

In Chemical Formula 1, $R^1$ and the $R^2$ are each independently hydrogen, deuterium, a substituent group represented by Chemical Formula 2, or a substituent group represented by Chemical Formula 3; at least one of $R^1$ and the $R^2$ is independently the substituent group represented by the Chemical Formula 2, or the substituent group represented by the Chemical Formula 3; and in the Chemical Formula 2 and the Chemical Formula 3, n and m are each independently any one integer of 1 to 5.

Preferably, $R^1$ may be hydrogen, and $R^2$ may be the substituent group represented by Chemical Formula 2.

Preferably, in Chemical Formula 2, n may be 2.

When the nano-diamond is heat-treated to oxidize the surface thereof, a carboxy group may be formed onto the surface of the nano-diamond.

Preferably, the heat-treating of the nano-diamond to oxidize the surface may be performed at a temperature of about 450 to 600° C.

Preferably, the heat-treating of the nano-diamond to oxidize the surface may be performed for about 0.5 to 3 hours.

In particular, the substituent group represented by the Chemical Formula 1 may be introduced (e.g. attached via covalent bonding, hydrogen bonding, ionic bonding or other linkages) onto the oxidized surface of the nano-diamond by steps comprising: reacting of a carbodiimide-based compound, an amine-based compound, and the carboxy group formed on the nano-diamond having the oxidized surface.

The reaction of the carbodiimide-based compound, the amine-based compound, and the carboxy group formed on the nano-diamond having the oxidized surface may be a reaction including introducing an activated ester group onto the surface of the nano-diamond by using the carbodiimide-based compound, and reacting the activated ester group and the amine-based compound.

Thus, in certain aspects, hydrogen bindings may occur between the oxidized nano-diamond surfaces. In some aspects, covalent bond formation also may be possible.

The carbodiimide-based or carbodiimide-containing compound may be a variety of compounds comprising one or more carbodiimide groups such as 1-ethyl-3-(3-dimethylaminopropyl)carbodiimide (EDC), dicyclohexylcarbodiimide (DCC), or N,N'-diisopropylcarbodiimide (DIC). A carbodiimide (or methanediimine) is understood to be a functional group of RN=C=NR.

The amine-based compound may be a compound represented by the following Chemical Formula 4.

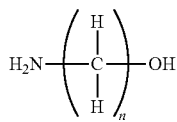
[Chemical Formula 4]

Herein n is 1 to 5.

Preferably, in Chemical Formula 4, n may be 2.

The method of manufacturing the nano-diamond may further include, before the heat-treating of the nano-diamond to oxidize the surface thereof, pulverizing the nano-diamond.

Preferably, when the nano-diamond is pulverized, an average particle diameter of the pulverized nano-diamond may range from about 1 to about 100 nm.

Further, the nano-diamond may be pulverized by a ball mill, a mortar, a sieve, an attrition mill, a disk mill, a jet mill, a jaw crusher, a crusher, or a combination thereof.

The nano-diamond may be pulverized under an oxygen or air atmosphere.

Further provided is a nano-fluid comprising the nano-diamond as described herein, and a polar fluid.

Exemplary polar fluid may be water, ethylene glycol, propylene glycol, or a combination thereof, without limitations.

According to various exemplary embodiments of the present invention, the nano-diamond may have improved dispersibility in a polar fluid. As such, to the present invention may provide a nano-fluid of which thermal conductivity may be substantially improved.

DETAILED DESCRIPTION OF THE EMBODIMENTS

Figure 1:
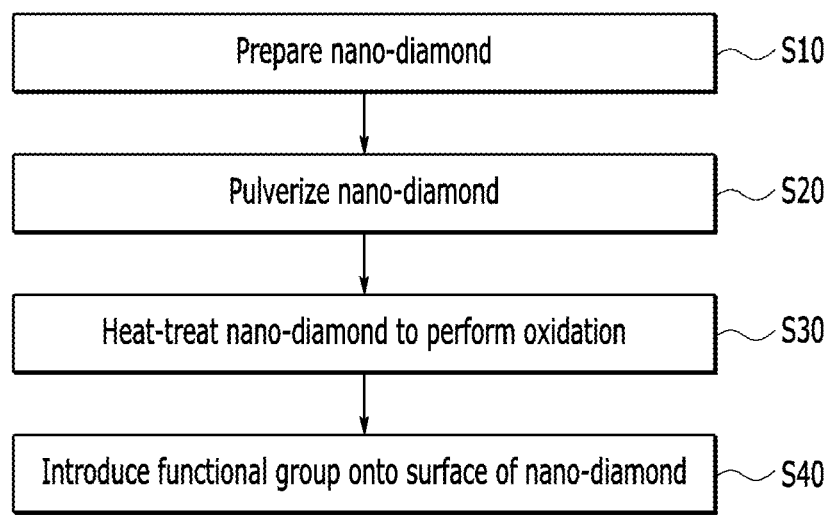
FIG. 1 is a flowchart of an exemplary method of manufacturing an exemplary nano-diamond according to an exemplary embodiment of the present invention.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail.

However, the exemplary embodiments are illustrative only but are not to be construed to limit the present disclosure, and the present disclosure is just defined by the scope of the claims as will be described below.

In the present specification, unless differently defined, an "average particle diameter" means an average value of the largest diameters of the particles which may form aggregation.

The present invention provides a nano-diamond that includes a functional group having affinity with a polar fluid. For example, the functional group may be introduced onto a surface thereof. Preferably, as consequence, the nano-diamond may comprise the functional group on the surface thereof. Further, provided is a method of manufacturing the same, and a nano-fluid using the same. According to preferred aspects of the present invention, dispersibility of the nano-diamond in the polar fluid may be improved, and further, thermal conductivity of the nano-fluid may be improved. The nano-fluid may be used in various field, such as a vehicle antifreeze, a lubricant, a coating raw material, a raw material of a radiation product, and the like, but the examples are not limited thereto. Further, the nano-fluid may be variously used in a complex material requiring intrinsic properties of the diamond.

An exemplary embodiment of the present invention provides a nano-diamond and a functional group represented by Chemical Formula 1 may be introduced onto a surface thereof. Thus, the nano-diamond may comprise the functional group on the surface thereof.

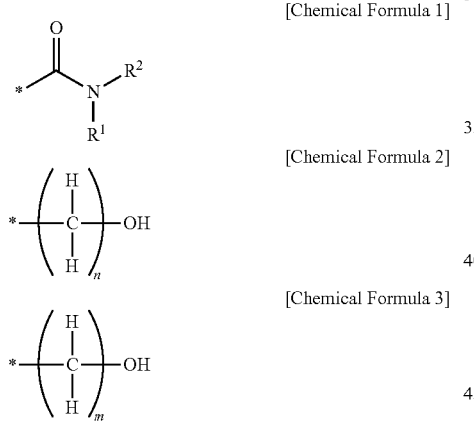

[Chemical Formula 1]

[Chemical Formula 2]

[Chemical Formula 3]

$R^1$ and $R^2$ may each independently be hydrogen, deuterium, a substituent group represented by Chemical Formula 2, or a substituent group represented by Chemical Formula 3.

At least one of $R^1$ and $R^2$ may independently be the substituent group represented by the Chemical Formula 2 or the substituent group represented by the Chemical Formula 3.

In the Chemical Formula 2 and the Chemical Formula 3, n and m may each independently be any one integer of 1 to 5.

Preferably, $R^1$ may be hydrogen, and $R^2$ may be the substituent group represented by the Chemical Formula 2.

In particular, $R^1$ may be hydrogen, $R^2$ may be the substituent group represented by the Chemical Formula 2, and n may be 2.

For example, a hydroxy group (—OH) may be introduced onto the surface of the nano-diamond, and the nano-diamond may comprise the hydroxyl group (—OH) on the surface thereof.

Therefore, through a hydrogen bond between the polar fluid and the nano-diamond and the like, bonding force between the polar fluid and the nano-diamond may be improved. As consequence, dispersibility of the nano-diamond in the polar fluid may be improved.

An average particle diameter of the nano-diamond may range from about 1 to about 100 nm. When the average particle diameter is less than the predetermined range, for example, less than about 1 nm, when the nano-diamond is manufactured, it may be difficult to control the particle size. In contrase, when the average particle diameter is greater than about the predetermined range, for example, greater than about 100 nm, the nano-diamond may not be suitable for application to the fluid.

Another exemplary embodiment of the present invention provides a method of manufacturing a nano-diamond. The method may comprise steps of: preparing the nano-diamond (S10); heat-treating the nano-diamond to oxidize a surface (S30); and introducing a substituent group represented by the following Chemical Formula 1 onto the surface of the nano-diamond having the oxidized surface (S40), such that the nano-diamond may comprise the substituent group on the surface thereof.

FIG. 1 is a flowchart of the method of manufacturing the nano-diamond.

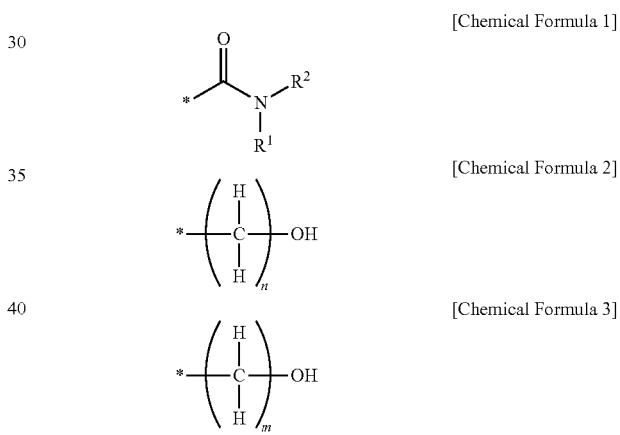

[Chemical Formula 1]

[Chemical Formula 2]

[Chemical Formula 3]

Herein, $R^1$ and $R^2$ may each independently be hydrogen, deuterium, a substituent group represented by Chemical Formula 2, or a substituent group represented by Chemical Formula 3.

At least one of $R^1$ and $R^2$ may be independently the substituent group represented by the Chemical Formula 2 or the substituent group represented by the Chemical Formula 3.

In Chemical Formula 2 and Chemical Formula 3, n and m may each independently be any one integer of 1 to 5.

Preferably, $R^1$ may be hydrogen, and $R^2$ may be the substituent group represented by Chemical Formula 2.

In particular, $R^1$ may be hydrogen, $R^2$ may be the substituent group represented by Chemical Formula 2, and n may be 2.

Addition of this functional group may increase or maximize affinity of the nano-diamond and the polar fluid. As such, long-term durability dispersion of the nano-particle may be secured.

Further, the addition of the functional group may suppress waste water which may be generated in reformation of the surface by a generally-used acid or base, and may contribute to improvement of uniformity of a reaction and productivity.

The method may further include, as a step prior to the step of heat-treating the nano-diamond to oxidize the surface (S30), pulverizing the nano-diamond (S20).

Before heat-treatment, the nano-diamond may be pulverized to substantially increase or maximize expose the surface of the nano-diamond particle to oxygen in heat treatment.

In the step of pulverizing the nano-diamond (S20), the average particle diameter of the pulverized nano-diamond may range from about 1 to about 100 nm. When the average particle diameter is less than about 1 nm, when the nano-diamond is manufactured, it may be difficult to control the particle size. When the average particle diameter is greater than about 100 nm, the nano-diamond may not be suitable for application to the fluid.

The nano-diamond (S20) may be pulverizing by a method including a ball mill, a mortar, a sieve, an attrition mill, a disk mill, a jet mill, a jaw crusher, a crusher, or a combination thereof.

The step of pulverizing the nano-diamond (S20) may be performed under an oxygen or air atmosphere.

By the step of heat-treating the nano-diamond to oxidize the surface (S30), a carboxy group may be formed onto the surface of the nano-diamond.

Generally, since the nano-diamond may be manufactured by explosion, the nano-diamond does not have a perfect $SP^3$ structure, and various functional groups may be included in the surface. Particularly, the functional groups may be diversified according to a condition of an explosion reaction.

Generally, in the surface of the nano-diamond, there may be functional groups such as carboxy group (—COOH), alkyl group (—C—H), amine group (—N—H), and ether group (—C—O—C). However, for a selective chemical reaction, one functional group of surface reaction groups needs to be changed to be predominant.

According to an exemplary embodiments, when the heat-treatment is performed, an unstable portion of the functional groups in the surface of the nano-diamond may be oxidized into a carboxy group (—COOH). Further, through heat-treatment, impurities of the surface of the nano-diamond, such as amorphous carbon, may be removed. As such, a contacting surface between the nano-diamond and the fluid may be increased.

In the present step (S30), the carboxy group may be substantially or maximally generated through a heat-treatment oxidation reaction. Thereafter, by introducing a selective functional group having affinity with the fluid through a chemical reaction, dispersibility of the nano-diamond in the fluid may be improved.

The step of heat-treating the nano-diamond to oxidize the surface (S30) may be performed at a temperature of about 450 to 600° C. When the temperature for heat-treatment is less than the predetermined range, for example, less than 450° C., the oxidation reaction may not sufficiently occur. When the temperature thereof is greater than about 600° C., many side reactions may occur other than the oxidation reaction.

The step of heat-treating the nano-diamond to oxidize the surface (S30) may be performed for about 0.5 to 3 hours. When heat-treatment time is less than the predetermined range, for example, less than about 0.5 hour, reactivity may be reduced. When the heat-treatment time is greater than about 3 hours, unnecessary reaction may further occur.

The step of introducing the substituent group represented by the following Chemical Formula 1 onto the surface of the nano-diamond having the oxidized surface (S40) may be performed by a reaction of a carbodiimide-based or carbodiimide-containing compound, an amine-based compound, and the nano-diamond having the oxidized surface.

In particular, the reaction of the carbodiimide-based or carbodiimide-containing compound, the amine-based compound, and the nano-diamond having the oxidized surface may include a step of introducing an activated ester group onto the surface of the nano-diamond by using the carbodiimide-based or carbodiimide-containing compound, and a step of reacting the activated ester group and the amine-based compound. For example, the activated ester group may be formed by reaction of the carboxy group on the oxidized nano-diamond with a carbodiimide-based compound.

Preferably, the carbodiimide-based or carbodiimide-containing compound may be 1-ethyl-3-(3-dimethylaminopropyl)carbodiimide (EDC), dicyclohexylcarbodiimide (DCC), or N,N'-diisopropylcarbodiimide (DIC).

An exemplary reaction mechanism is as follows.

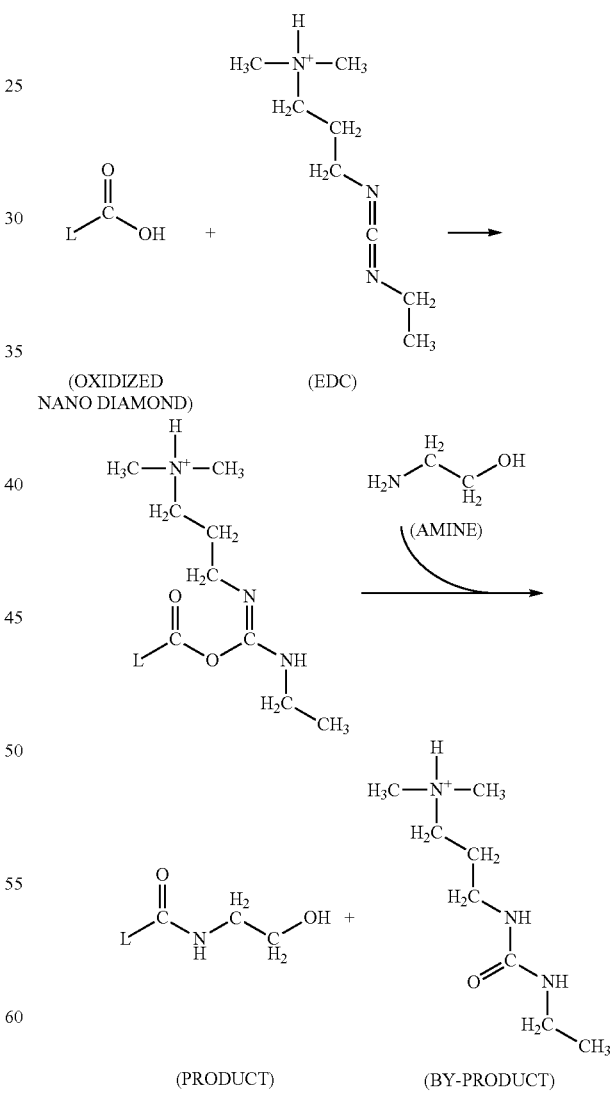

In the mechanism, L is the nano-diamond without only the carboxy group formed after the heat treating of the surface functional groups.

The amine-based compound may be a compound represented by the following Chemical Formula 4.

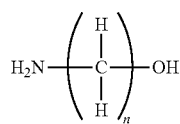
[Chemical Formula 4]

In the Chemical Formula 4, n is 1 to 5.

To be more specific, in Chemical Formula 4, n may be 2.

Further, in another exemplary embodiment of the present invention, provided is a nano-fluid including the nano-diamond provided by the aforementioned exemplary embodiment, and a polar fluid.

The polar fluid may be water, ethylene glycol, propylene glycol, or a combination thereof, but the examples may not be limited thereto.

Preferably, the nano-fluid may be manufactured by mixing and dispersing the nano-diamond and the polar fluid.

EXAMPLE

Hereinafter, a preferred example and a comparative example of the present invention will be described.

However, the following examples are only the preferred examples of the present invention, but the present disclosure is not limited to the following examples.

Preparation of Nano-Diamond

1. Oxidation Heat-Treatment of Nano-Diamond

The nano-diamond powder (Manufacturer: HeYuan ZhongLian Nanotech Co. LTD) was used. The powder was pulverized by using a jet mill (Manufacturer: (Japan) HOSOKAWA MICRON Ltd.) using compressed air. The reaction time was adjusted according to the amount of powder used so that the air and the surface of the nano-diamond powder were sufficiently reacted. For example, 100 g of the nano-diamond powder was pulverized by using the jet mill for 30 minutes.

The average particle diameter of the pulverized nano-diamond powder was 50 nm.

Thereafter, the pulverized powder was heat-treated in an air atmosphere at a temperature 500° C. for 1 hour.

2. Introduction of Functional Group into Oxidized Nano-Diamond

The heat-treated nano-diamond was added into ethylene glycol (0.5 g/L, Manufacturer: Sigma-Aldrich Corporation) and treated with 300 W ultrasonic waves for about 30 minutes as being stirred. 500 ml of the nano-diamond solution which was thus manufactured was put into the round bottom flask, and 5 g of 1-ethyl-3-(3-dimethylamino-propyl)carbodiimide (EDC) and 50 ml of ethanol amine were added. Thereafter, while agitation was performed at 400 rpm, the reaction was performed at room temperature for 12 hours. After the reaction, the remaining reagent was removed through washing. The solvent was removed by drying in the oven to obtain the nano-diamond powder where the functional group of the following Chemical Formula 5 was introduced onto the surface thereof, and the nano-diamond included the functional group on the surface thereof.

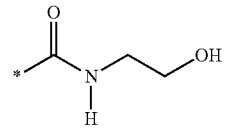
[Chemical Formula 5]

3. Manufacturing of Nano-Fluid Including Nano-Diamond into which Functional Group was Introduced Ethylene glycol (Manufacturer: Sigma-Aldrich Corporation) was used as the fluid. Ethylene glycol and the nano-diamond were mixed so that the addition amount of the nano-diamond was 0.5 wt % based on 100 wt % of the fluid. Thereafter, the mixture was further mixed at room temperature for 3 hours by using the ultrasonic wave dispersion mixing reactor to manufacture the nano-fluid.

Comparative Example

The nano-fluid was prepared by the same method as the example, except that the nano-diamond pulverized to have the average particle diameter of 50 nm was not subjected to heat-treatment and the process of introducing a functional group.

Experimental Examples

Experimental Example 1

Measurement of Average Particle Diameter of Nano-Diamond

Figure 2:
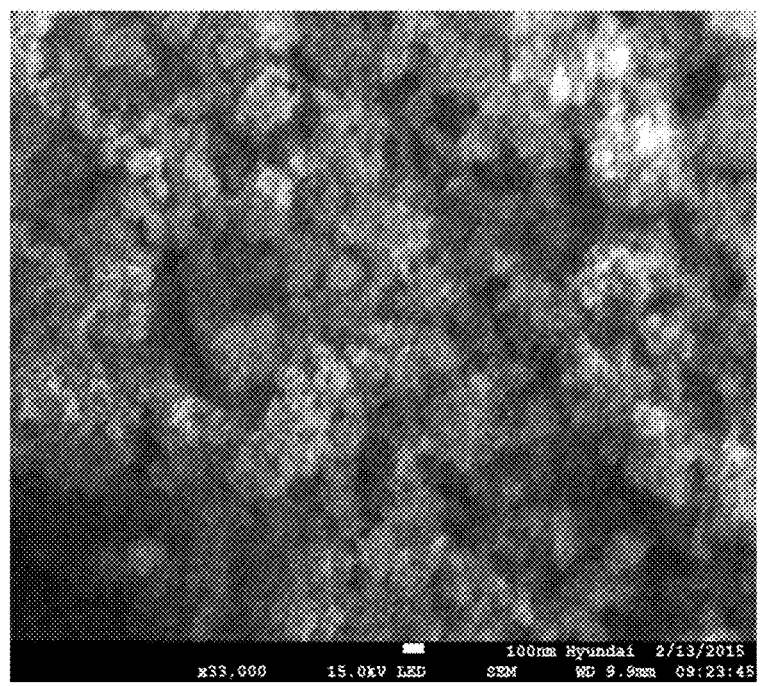
FIG. 2 is an SEM picture of an exemplary pulverized nano-diamond powder according to an exemplary embodiment of the present invention.

After the nano-diamond was pulverized by the jet mill, it was photographed by an SEM (Manufacturer: JEOL Ltd.) to measure the average particle diameter. The average particle diameter was measured to be 50 nm, and the SEM picture is illustrated in FIG. 2.

Experimental Example 2

FT-IR Analysis

The pulverized powder was analyzed by the infrared spectroscopy (Fourier transform infrared spectroscopy, FT-IR, Manufacturer: Agilent Technologies Company) to confirm that the carbonyl functional group (C=O) of carboxy functional group (—COOH) was formed on the surface of the nano-diamond.

Figure 3:
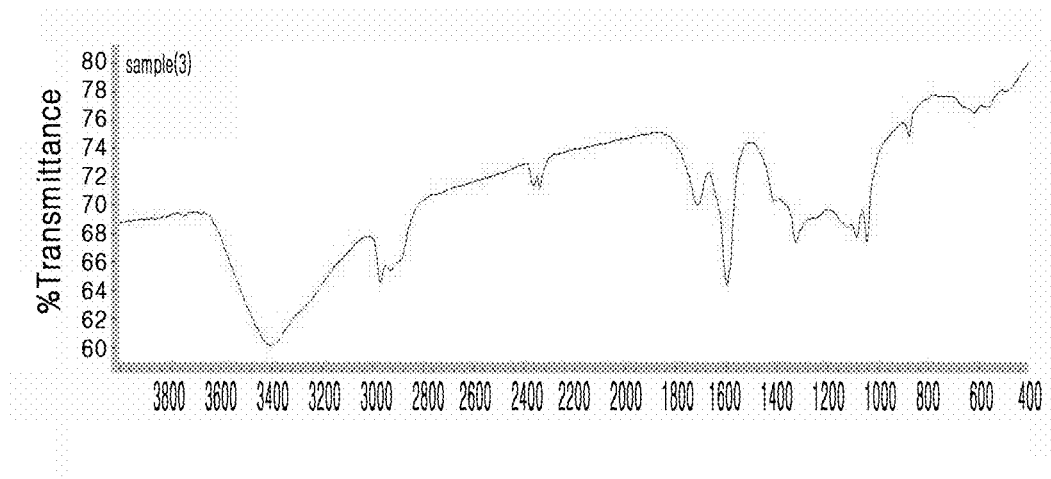
FIG. 3 shows FT-IR analysis data of an exemplary nano-diamond before heat-treatment according to an exemplary embodiment of the present invention.
Figure 4:
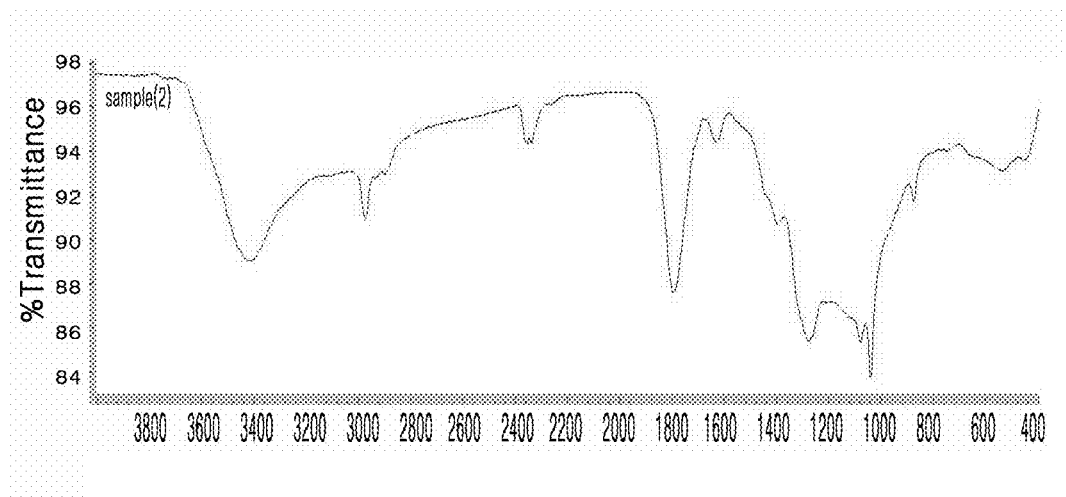
FIG. 4 shows FT-IR analysis data of an exemplar nano-diamond after heat-treatment according to an exemplary embodiment of the present invention.

The measure result is illustrated in FIG. 3 and FIG. 4. FIG. 3 shows an FT-IR analysis result before heat-treatment, and FIG. 4 is an FT-IR analysis result after heat-treatment. In FIGS. 3 and 4, it can be seen that the carboxy group peak (sharp peak around 1760 $cm^{-1}$) not shown before heat-treatment was shown after heat-treatment. That is, it was confirmed that various functional groups distributed on the surface of the nano-diamond before heat treatment were oxidized to generate the carboxy group.

Experimental Example 3

Confirmation of Dispersibility of Nano-Diamond Nano-Fluid

Dispersibilities of the manufactured nano-diamond nano-fluids of the example and the comparative example were confirmed.

Specifically, the nano-diamond nano-fluids of the example and the comparative example were each put into a 20 ml vial, and the degree of precipitation according to time was confirmed.

Figure 5:
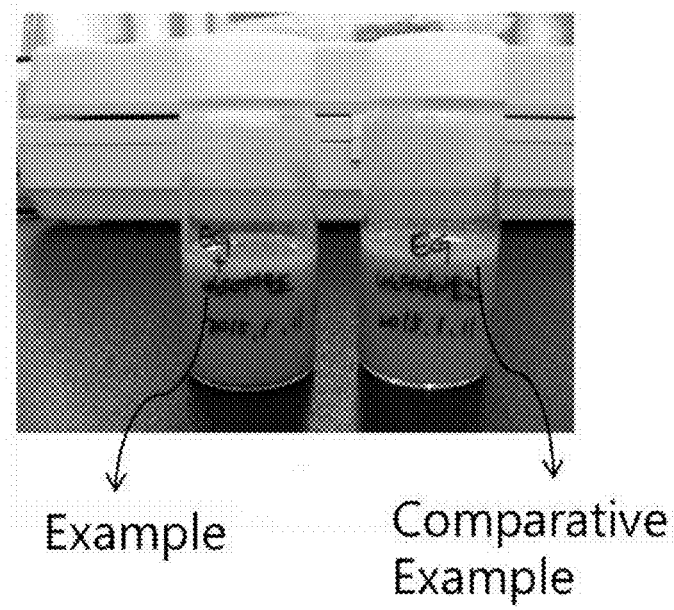
FIG. 5 shows dispersion of an exemplary nano-diamond fluid and a comparative example immediately after those nano-diamonds are dispersed in a fluid.
Figure 6:
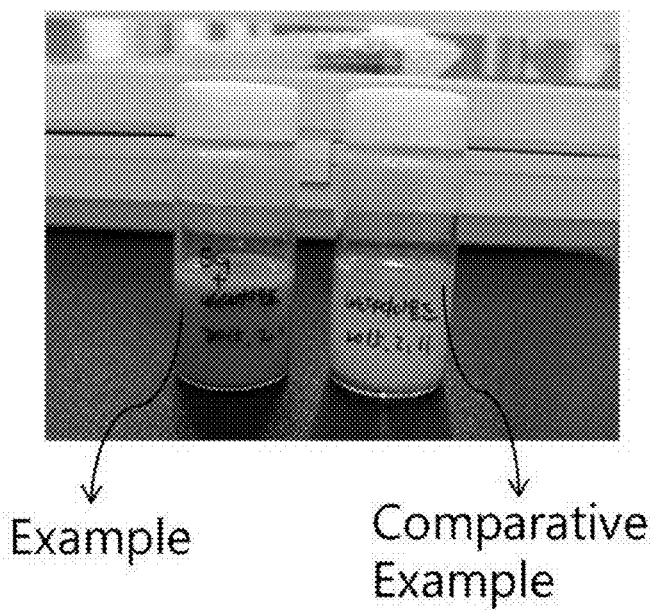
FIG. 6 shows dispersion of an exemplary nano-diamond fluid and a comparative example 30 days after the nano-diamonds are dispersed in a fluid.

The experimental results are illustrated in FIGS. 5 and 6.

In the two pictures, the left side is the example, and the right side is the comparative example.

FIG. 5 illustrates the dispersion state immediately after mixing, and FIG. 6 illustrates the dispersion state 30 days after mixing.

As confirmed by the naked eye, in the example of the left side, sufficient dispersibility was maintained even after 30 days.

On the other hand, in the comparative example of the right side, after 30 days, the nano-diamond particles sank to the bottom of the fluid, and thus dispersibility was poor.

Experimental Example 4

Measurement of Thermal Conductivity of Nano-Diamond Nano-Fluid

Thermal conductivity of the nano-fluid of the example was measured.

Specifically, measurement was performed through a transient hot wire method.

As the comparative target, glycerin (Manufacturer: Sigma-Aldrich Corporation) and ethylene glycol (Manufacturer: Sigma-Aldrich Corporation) which were not mixed with the nano-diamond were selected.

Thermal conductivities of glycerin, ethylene glycol, and the nano-fluid of the example were measured, and the measurement results are arranged in Table 1.

TABLE 1

| Sample | Average thermal conductivity (W/m · K) | Maximum deviation | Reference (at 25° C.) | $k_{nanofluid}/k_{basefluid}$ |
|---|---|---|---|---|
| Glycerin | 0.2884 | 0.0044 | 0.285 | |
| Ethylene glycol (EG) | 0.25083 | 0.01243 | 0.249 | |
| Example | 0.3372 | 0.001853 | | 1.34 |

It can be seen that in the example, as compared to the glycerin and ethylene glycol fluids not mixed with the nano-diamond where the surface functional group was introduced, thermal conductivity of the fluid comprising the nano-diamond of the present invention was substantially improved by about 1.34 times.

In order to use high thermal conductivity of the nano-diamond, high dispersibility of the nano-diamond in the fluid needs to be maintained.

The present invention improves dispersibility of the nano-diamond by introducing the functional group having high affinity with the fluid onto the surface of the nano-diamond. This effect was confirmed from the aforementioned experimental examples, and it was confirmed that the present invention may provide the property which was suitable for industrial application.

The present invention is not limited to the disclosed embodiments, but may be manufactured in different various forms, and it will be understood by those skilled in the art that various modifications and changes may be made thereto without departing from the technical spirit or essential feature of the invention. Therefore, it should be understood that the aforementioned embodiments are exemplary but not limitative in all aspects.

What is claimed is:

1. A method of manufacturing a nano-diamond comprising:
preparing the nano-diamond;
heat-treating the nano-diamond to oxidize a surface thereof; and
introducing a substituent group represented by the following Chemical Formula 1 onto the surface of the nano-diamond having the oxidized surface:

[Chemical Formula 1]

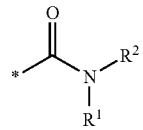

wherein, in Chemical Formula 1, $R^1$ is hydrogen and $R^2$ is a substituent group represented by Chemical Formula 2;

[Chemical Formula 2]

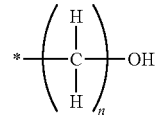

wherein, in the Chemical Formula 2, n is any one integer of 1 to 5.

2. The method of claim 1, wherein in the Chemical Formula 2, n is 2.

3. The method of claim 1, wherein when the nano-diamond is heat-treated to oxidize the surface, a carboxy group is formed onto the surface of the nano-diamond.

4. is amended as follows: The method of claim 3, wherein the substituent group represented by the Chemical Formula 1 is introduced onto the oxidized surface of the nano-diamond by steps comprising reacting a carbodiimide-based compound, an amine-based compound, and the carboxy group formed on the nano-diamond having the oxidized surface.

5. The method of claim 4, wherein the carbodiimide-based compound, the amine-based compound, and the nano-diamond having the oxidized surface is reacted comprising steps of:
introducing an activated ester group onto the surface of the nano-diamond by using the carbodiimide-based compound; and reacting the activated ester group and the amine-based compound.

6. The method of claim 5, wherein the carbodiimide-based compound is 1-ethyl-3-(3-dimethylaminopropyl)carbodiimide (EDC), dicyclohexylcarbodiimide (DCC), or N,N'-diisopropylcarbodiimide (DIC).

7. The method of claim 5, wherein the amine-based compound is a compound represented by the following Chemical Formula 4:

[Chemical Formula 4]

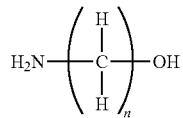

wherein in the Chemical Formula 4, n is 1 to 5.

8. The method of claim 7, wherein in the Chemical Formula 4, n is 2.

9. The method of claim 1, wherein the nano-diamond is heat-treated at a temperature from about 450 to about 600° C.

10. The method of claim 1, wherein the nano-diamond is heat-treated for about 0.5 to 3 hours.

11. The method of claim 1, further comprising, before the heat-treating of the nano-diamond to oxidize the surface, pulverizing the nano-diamond.

12. The method of claim 11, wherein when the nano-diamond is pulverized, an average particle diameter of the pulverized nano-diamond ranges from about 1 to about 100 nm.

13. The method of claim 11, wherein the nano-diamond is pulverized using a ball mill, a mortar, a sieve, an attrition mill, a disk mill, a jet mill, a jaw crusher, a crusher, or a combination thereof.

14. The method of claim 11, wherein the nano-diamond is pulverized under an oxygen or air atmosphere.

* * * * *